US010562205B2

(12) United States Patent
Manura et al.

(10) Patent No.: US 10,562,205 B2
(45) Date of Patent: Feb. 18, 2020

(54) SLIDING SLED FOR CUTTING PRECISION SEGMENTS ON A BAND SAW (71) Applicant: Accu-Slice, LLC, Ringoes, NJ (US)

(72) Inventors: John J. Manura, Ringoes, NJ (US); Thomas F. Coughlan, Sellersville, PA (US); Daniel Joseph Niedziocha, New Hope, PA (US); Christopher Wayne Baker, Doylestown, PA (US)

(73) Assignee: AACU-SLICE, LLC, Ringoes, NJ (US)

( * ) Notice: Subject to any disclaimer, the term of this patent is extended or adjusted under 35 U.S.C. 154(b) by 14 days.

(21) Appl. No.: 15/788,541

(22) Filed: Oct. 19, 2017

(65) Prior Publication Data

US 2018/0104846 A1    Apr. 19, 2018

Related U.S. Application Data (63) Continuation-in-part of application No. 15/294,729, filed on Oct. 16, 2016, now Pat. No. 10,035,281.

(Continued)

(51) Int. Cl.
*B27B 27/10* (2006.01)
*B27B 27/02* (2006.01)
(Continued)

(52) U.S. Cl.
CPC ............ *B27B 27/10* (2013.01); *B23D 55/023* (2013.01); *B23D 55/046* (2013.01); *B27B 13/04* (2013.01); *B27B 27/02* (2013.01); *B27B 25/10* (2013.01)

(58) Field of Classification Search
CPC ............... B23D 55/023; B23D 55/046; B23D 57/0046; B26D 55/02; B27B 13/04;
(Continued)

(56) References Cited

U.S. PATENT DOCUMENTS 2,905,210 A * 9/1959 Dimitri ................... B27B 25/10
83/416
3,521,683 A * 7/1970 Kirkpatrick .......... B23D 47/025
144/21

(Continued)

FOREIGN PATENT DOCUMENTS

CA       2488074 A1 * 5/2006 ............. B23D 47/02
DE       9207811 U1 * 1/1993 ............. B23D 47/04
(Continued)

*Primary Examiner* — Jennifer B Swinney
(74) *Attorney, Agent, or Firm* — Wayne Carroll; Inspired Idea Solutions Law Firm (57) ABSTRACT A device and method are disclosed. An embodiment of a sliding sled for use on a saw table includes a flat plate, adjustable guide fences on the flat plate at a fixed pivot end to create an oblique angle relative to the saw table, an indexing system including angle indicators to set the angles of the adjustable guide fences, roller bearings on the bottom side of the flat plate for riding on the ACCU-SLICE™ rail, and a sawdust shield to keep sawdust off the roller bearings and ACCU-SLICE™ rail. Guide fences may have a fixed pivot end and a movable end and a locking bolt to temporarily fix the movable end at a desired position on the plate. The movable end of the adjustable guide fences may align with the angle indicators when the angle of the adjustable guide fence relative to the cutting plane corresponds to the angle indicators.

17 Claims, 5 Drawing Sheets

Related U.S. Application Data (60) Provisional application No. 62/479,370, filed on Mar. 31, 2017.

(51) Int. Cl.
*B23D 55/04* (2006.01)
*B23D 55/02* (2006.01)
*B27B 13/04* (2006.01)
*B27B 25/10* (2006.01)

(58) Field of Classification Search
CPC ......... B27B 27/00; B27B 27/02; B27B 27/04; B27B 27/08; B27B 27/06; B27B 27/10; Y10T 83/7593; Y10T 83/76; Y10T 83/7607; Y10T 83/7613; Y10T 83/762; Y10T 83/7627
See application file for complete search history.

(56) References Cited

U.S. PATENT DOCUMENTS

| | | | | |
|---|---|---|---|---|
| 4,441,394 | A * | 4/1984 | Barsotti | B23D 47/025 |
| | | | | 83/409 |
| 4,693,156 | A * | 9/1987 | Olvera | B27B 25/10 |
| | | | | 269/304 |
| 5,483,858 | A * | 1/1996 | Chen | B23D 47/04 |
| | | | | 269/303 |
| 2004/0065387 | A1 * | 4/2004 | Smith | B23Q 3/007 |
| | | | | 144/253.1 |
| 2006/0005680 | A1 * | 1/2006 | Gehret | B27B 5/165 |
| | | | | 83/471.3 |
| 2006/0053992 | A1 * | 3/2006 | Williams | B27G 5/023 |
| | | | | 83/435.12 |

FOREIGN PATENT DOCUMENTS

| | | | | |
|---|---|---|---|---|
| DE | 9307570 U1 | * | 8/1993 | ............. B27B 27/02 |
| EP | 162401 A1 | * | 11/1985 | |

* cited by examiner

SLIDING SLED FOR CUTTING PRECISION SEGMENTS ON A BAND SAW

INCORPORATION BY REFERENCE

This application incorporates by reference U.S. Nonprovisional patent application Ser. No. 15/294,729 titled "SAW SLICER GUIDE" which was filed on Oct. 16, 2016 and U.S. Provisional Patent Application Ser. No. 62/479,370 titled "SLIDING SLED FOR CUTTING PRECISION SEGMENTS ON A BAND SAW" filed on Mar. 31, 2017.

FIELD

This disclosure relates to guides for saws having a table, the guide having a rectilinearly moving work sliding sled and means to move the sliding sled (and workpiece) transversely towards the cutting plane of the saw.

BACKGROUND

Segmented wood turning is the practice of assembling triangular segments (wedges) of wood around a center point so they form a block with a particular desired cross-sectional shape, such as a disc with a pentagonal, hexagonal, octagonal or other multi-sided cross-sectional shape where each segment (wedge) is the same size. The more segments are assembled, i.e. the smaller the segments, the more circular the cross-section. The challenge in segmented wood turning is that the segments of wood must be cut precisely with the proper angled sides so that when assembled they fit together smoothly and form the desired disc shape with the desired number of identically sized and shaped wedge segments.

Using a table saw to cut segments wastes wood in that table saws create a much larger kerf than a band saw, so more wood is lost to sawdust. Using a table saw to cut segments also can be dangerous, particularly when many small segments are desired. Moreover, if a large number of small segments are desired, such as 36, 48 or 72 segments, a table saw is difficult to use in that the smaller the wedge the greater the danger to the wood worker's fingers and the smaller the acceptable margin of error.

Band saws typically cut a smaller (narrower) kerf than table saws, however, typically they create a coarser cut and are more susceptible to blade drift, making them disadvantageous for cutting wedges for segmented wood turning. If the cut edges of wedges are not smooth, the finished block will have undesirable gaps between wedge segments.

Therefore, there is a need in the art for a system and method that can overcome these disadvantages of prior systems and methods, and provide a safer, smoother cut when cutting wedges from a wood blank workpiece for segmented wood turning.

Before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed embodiments. It is important, therefore, that the claims be regarded as including such equivalent constructions insofar as they do not depart from the spirit and scope of the disclosed embodiments.

SUMMARY

In some embodiments a sliding sled may be used with a saw table having a blade and a cutting plane. The sliding sled may include a rail system mountable on the saw table with a guide rail parallel to the cutting plane. A flat plate may be mountable on the rail system, the flat plate may have a top side, and a front edge parallel to the guide rail. A first adjustable guide fence may be connected to the top side of the flat plate at a first fixed pivot end of the first adjustable guide fence. The first adjustable guide fence may be adjustable about the first fixed pivot end to create an oblique angle relative to the front edge of the flat plate. The sliding sled may include a first locking fastener connected to the first adjustable guide fence to releasably fix the oblique angle of the first adjustable guide fence.

In some embodiments a sliding sled may include an indexing system including angle indicators on the flat plate. The indexing system may include a first spring loaded bearing mounted in the first adjustable guide fence with the spring loaded bearing biased against the top side of the flat plate, and multiple divots on the top side of the flat plate. The multiple divots may be positioned to allow the spring loaded bearing to enter the multiple divots when the first adjustable guide fence is at oblique angles corresponding to the angle indicators. The multiple divots may be positioned to correspond to the angle indicators on the flat plate.

In some embodiments the first adjustable guide fence may include a first movable end, and the first movable end may align with each of the angle indicators when the angle of the first adjustable guide fence relative to the cutting plane corresponds to each of the angle indicators.

In some embodiments the flat plate includes a bottom side and a sawdust shield may be connected to the bottom side of the flat plate. Multiple bearings may be connected to the bottom side of the sliding sled for connecting to the guide rail to allow the sliding sled to move along the guide rail parallel to the cutting plane.

In some embodiments the sliding sled includes a second adjustable guide fence connected to the top side of the flat plate at a second fixed pivot end of the second adjustable guide fence. The second adjustable guide fence may be adjustable about the second fixed pivot end to create an oblique angle relative to the front edge of the flat plate.

The first locking fastener may be a locking bolt. The sliding sled may include a locking channel in the flat plate. The locking bolt may extend into the locking channel.

In some embodiments a sliding sled for use with a saw table may include a blade and a cutting plane. The saw table may have a rail system on the saw table with a guide rail parallel to the cutting plane. The sliding sled may include a flat plate mountable on the rail system, the flat plate may have a top side, a bottom side, and a front edge parallel to the guide rail. The sliding sled may include a first adjustable guide fence connected to the top side of the flat plate at a first fixed pivot end of the first adjustable guide fence. The first adjustable guide fence may be adjustable about the first fixed pivot end to create an oblique angle relative to the front edge of the flat plate. A first locking fastener may be connected to the first adjustable guide fence to releasably fix the oblique angle of the first adjustable guide fence. A second adjustable guide fence may be connected to the top side of the flat plate at a second fixed pivot end of the second adjustable guide fence. The second adjustable guide fence may be adjustable about the second fixed pivot end to create an oblique angle relative to the front edge of the flat plate. A second locking fastener may be connected to the second adjustable guide fence to releasably fix the oblique angle of the second adjustable guide fence. Multiple bearings may be connected to the bottom side of the sliding sled for connecting to the guide rail to allow the sliding sled to move along the guide rail parallel to the cutting plane.

The indexing system may include a first and a second spring loaded bearing mounted in the first adjustable guide fence and the second guide fence with the first and second spring loaded bearing biased against the top side of the flat plate. The top side of the flat plate may include multiple divots positioned to allow the first and second spring loaded bearings to enter the multiple divots when the first and second adjustable guide fences are at oblique angles corresponding to the angle indicators.

In some embodiments a device may be mountable in a saw table with a cutting plane. The saw table may have a table length along the cutting plane and a miter slot that is parallel to the cutting plane. The device may include an anchor bar mountable in the miter slot with at least one anchor mechanism to removably secure the anchor bar in the miter slot. A guide rail may be connected to the anchor bar. The guide rail may be parallel to the anchor bar.

A sliding sled may be slidably engaged to the guide rail for movement along the guide rail in a direction parallel to the cutting plane. The sliding sled may include a first adjustable guide fence with a first fixed pivot end connected to the sliding sled. The first adjustable guide fence may be adjustable between various oblique angles relative to the cutting plane. The sliding sled may include a second adjustable guide fence with a second fixed pivot end connected to the sliding sled. The second adjustable guide fence may be adjustable between various oblique angles relative to the cutting plane. The anchor bar may include an anchor bar first end and an anchor bar second end. A first guide bar may be perpendicularly connected to the anchor bar first end and extending away from the cutting plane. A second guide bar may be perpendicularly connected to the anchor bar second end and may extend away from the cutting plane. A base may be slidably engaged to the first guide bar and the second guide bar to allow the base to have transverse movement relative to the cutting plane.

DETAILED DESCRIPTION

A sliding sled device 100 is shown in FIGS. 1-5. The wood worker may use a table saw to cut wedges from a wood blank for segmented wood turning. Table saws typically create smoother, straighter cuts than band saws in part because they are less susceptible to blade drift. To achieve the proper angle for the segments, the wood worker may custom build a jig with two fixed guide fences, one for each side of the segment being cut from a wood blank. Once he decides how many segments he wishes to cut (i.e. five segments for a pentagon, six for a hexagon, etc.), he can calculate the desired angle to cut the segments so they can be assembled into a three-hundred-sixty degree block. Once he knows the angle, the wood worker fixes the fences on the custom jig so they describe the desired angle between them, using a protractor or a commercially available accurate triangle segment with the desired angle as the wedge to measure the angle so he knows where to affix the fences on the jig. Using triangle segments to measure the angle may remove the need to calculate the angle and is simpler than using a protractor to measure the angle, but the custom built jig is still only as precise as the wood worker who built it.

A stop may be placed opposite the jig, across the cutting plane, and before the blade 162 so all wedges will be the same width. The wood worker alternates cuts with the wood blank placed against the first fence 210 and then the second fence 212, and the resulting wedge pieces therefore are cut at the desired angle described by the two fences 210 and 212. If the calculations were correct, if the fences 210 and 212 are fixed at precisely the correct angles and if the wood blank is securely held against the fences during cutting, the resulting wedges should fit together smoothly and accurately to form a block with the desired number of equal segments. In practice, it can be difficult to achieve the desired result, particularly when a greater number of segments is required, and particularly for the less experienced wood worker.

To make a block assembled of 72 wedges requires a much smaller angle than to make a block assembled of 5 wedges, and in order to fit together smoothly and create the desired shape block with uniform wedges and without undesirable gaps between wedges, the abutting edges of each wedge must be cut at precisely the correct angle and must be smooth. If initial cuts are not smooth they may be sanded smooth, but sanding can be laborious and time consuming, especially for blocks with a greater number of wedges.

A sliding sled was developed for use with a band saw and Applicant's ACCU-SLICE™ rail system to make it easier and safer to cut precise wedge segments for segmented wood turning applications on a band saw, with smoother cuts and less wasted wood.

Figure 1:
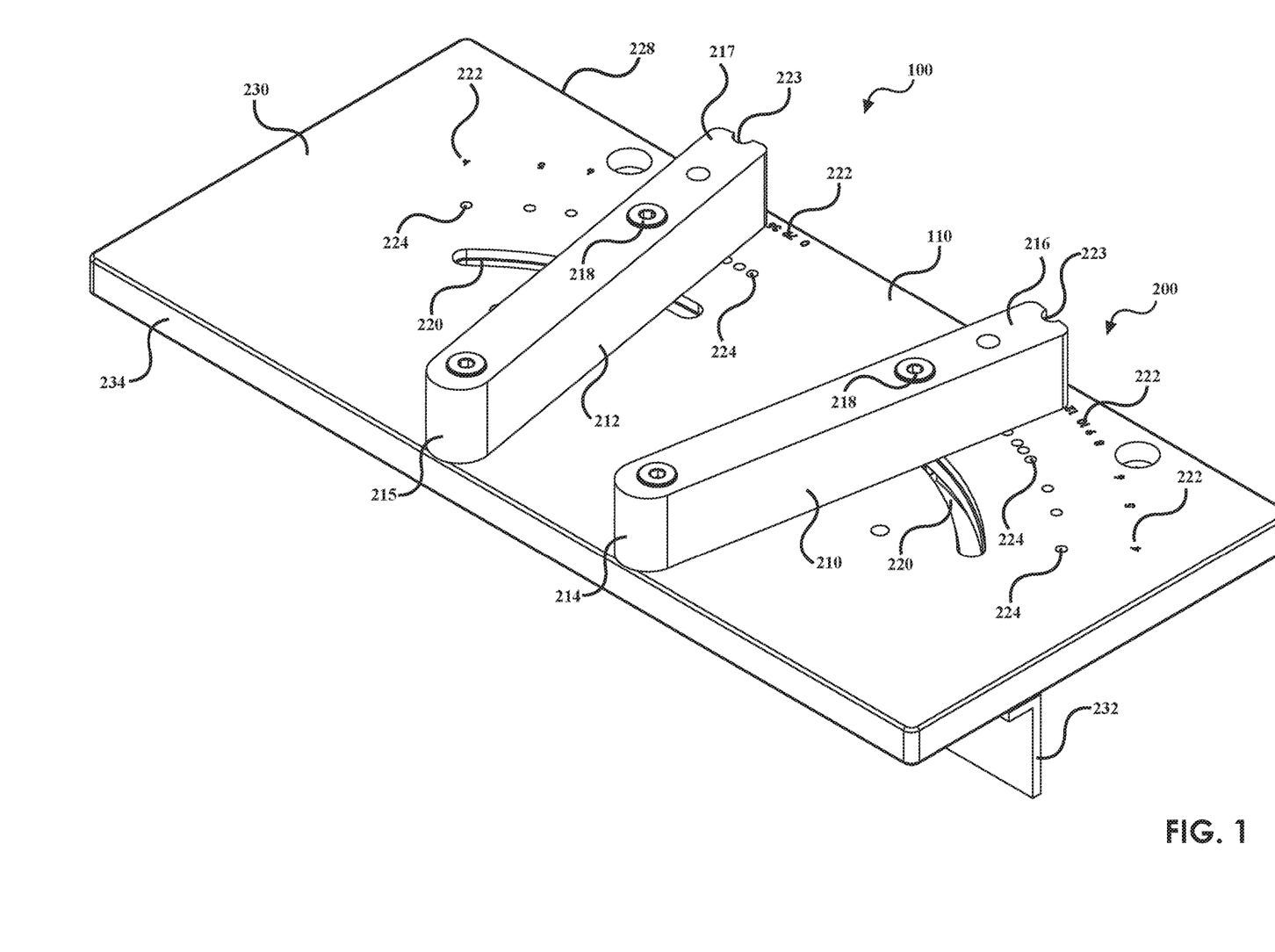
FIG. 1 shows a perspective view of a sliding sled according to some embodiments.
Figure 2:
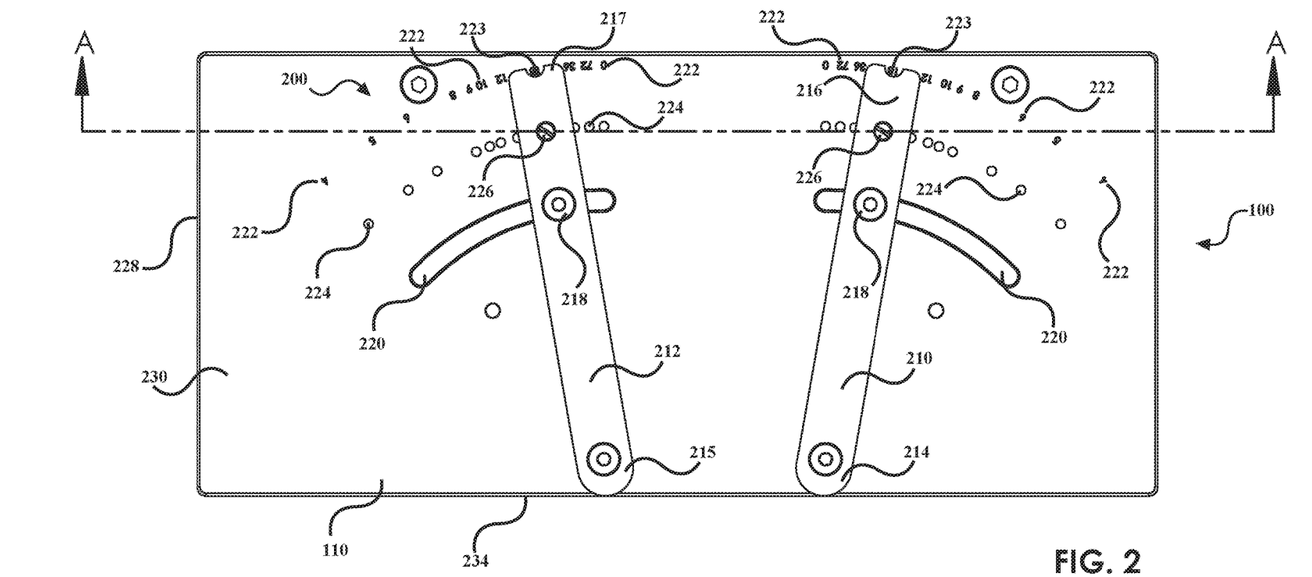
FIG. 2 shows a top view of a sliding sled according to some embodiments.
Figure 3:
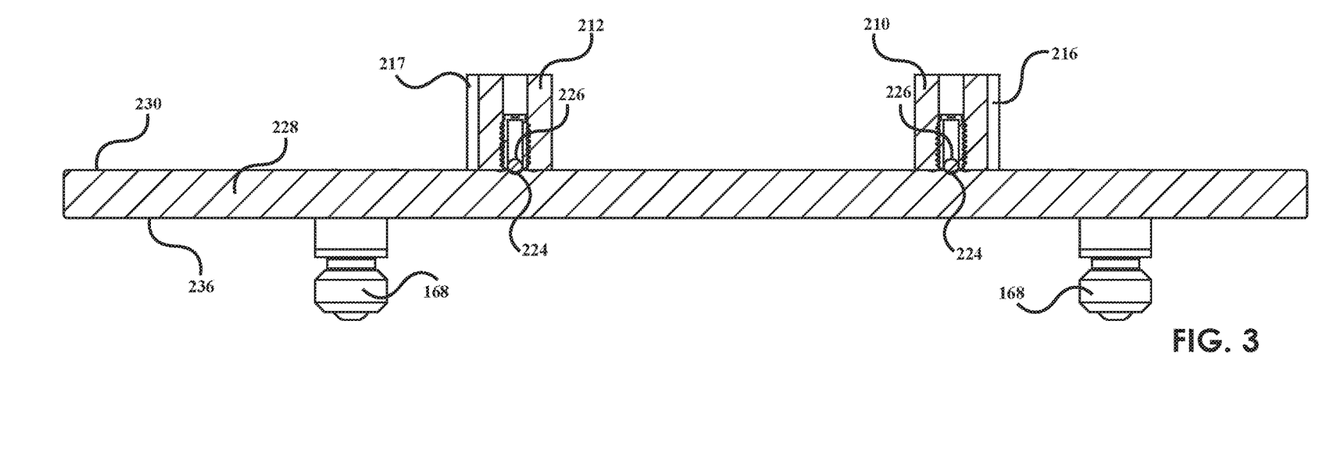
FIG. 3 shows a cut away view according to the line A-A in FIG. 2 according to some embodiments.
Figure 4:
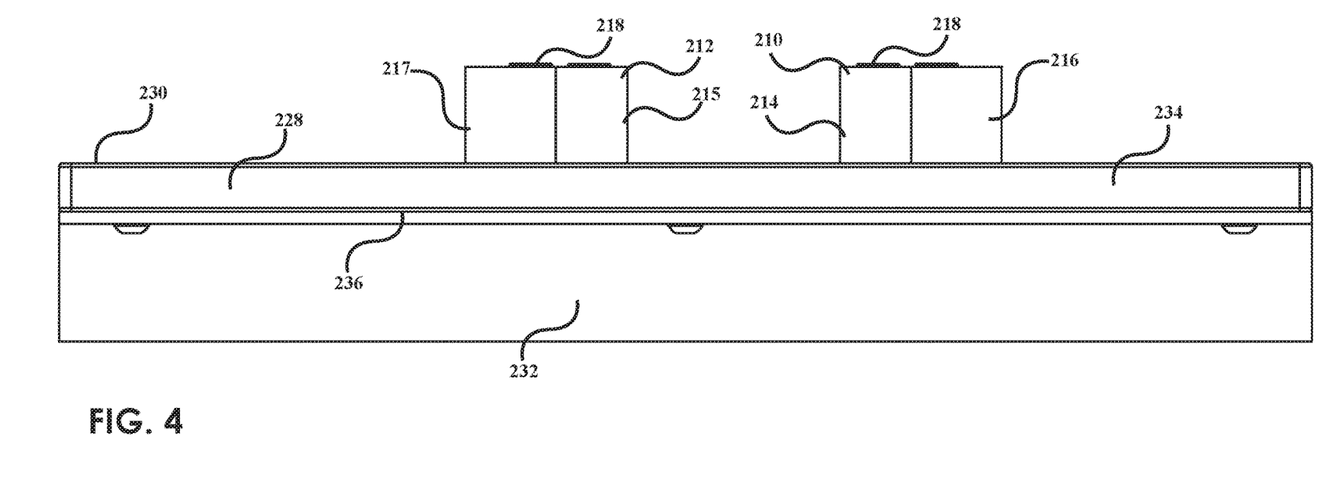
FIG. 4 shows a side view of a sliding sled according to some embodiments.
Figure 5:
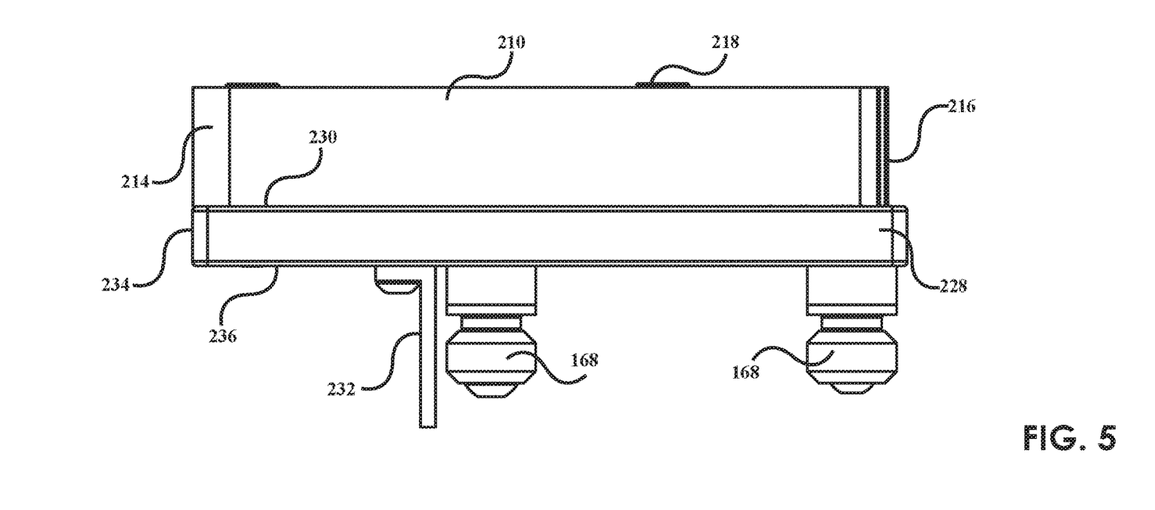
FIG. 5 shows a side view of a sliding sled according to some embodiments.
Figure 6:
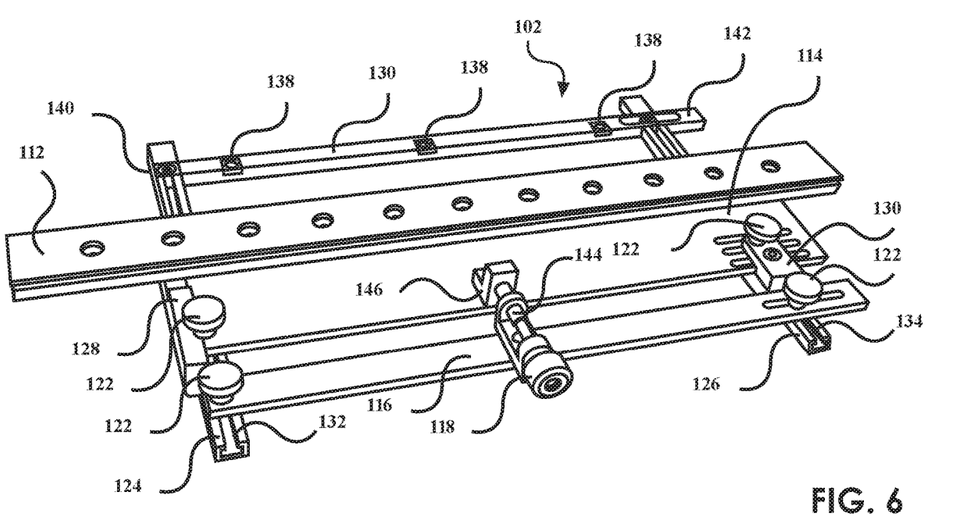
FIG. 6 shows an example of a rail system without a sliding sled.

Use of the sliding sled with ACCU-SLICE™ band saw rail system 102 (FIG. 6) enables smooth, precise, clean cuts requiring less sanding and without burn marks or wavy cuts due to uneven pressure. Smooth, accurate and repeatable cuts enable accurate fit of the wedges in assembly resulting in an assembled disc or block of the desired shape formed of smoothly abutting, uniform wedges without gaps. Some or all of these advantages as well as others may be achieved by some embodiments of a band saw slicer as disclosed.

An embodiment of a sliding sled includes a flat plate 228, a first adjustable guide fence 210 and a second adjustable guide fence 212 on the top side 230 of the plate 228, roller bearings 168 on the underside 236 of the plate 228 for riding on the ACCU-SLICE™ rail, and a sawdust shield 232 to keep sawdust off the roller bearings 168 and ACCU-SLICE™ rail and out of the roller bearing/rail area. Guide fences 210 and 212 may have a first fixed pivot end 214 and a second fixed pivot end 215 and a first movable end 216 and a second movable end 217. Each of the fences 210 and 212 may include a locking bolt 218 to temporarily fix the movable ends 216 and 217 at a desired position on the plate.

Some embodiments further include an indexing system 200 to guide a user where to fix the fences 210 and 212 so as to properly describe the angle needed to create wedges that will assemble into a block of the desired shape. An indexing system 200 greatly enhances accuracy and ease of use because a user need not measure the angle himself but rather may just use the indexing system 200 to fix the fences at the desired angles relative to the front edge 234. An indexing system may display the angle indicator 222 or may display the number of wedges desired; in the latter embodiment, a user need not calculate the angle needed but rather need only set the fences 210 and 212 to the position corresponding with the desired number of wedges, thus removing the possibility of user error in calculating the angle. An indexing system 200 further may include a means of locking or automatically, yet removably, fixing the fences in the proper positions for the desired number of wedges or angle, thus removing the possibility of user error or imprecision in fixing the fences in the desired position.

An indexing system may comprise markings showing pre-measured positions for the movable end of each fence to describe the angles needed to create a desired number of wedges to complete a complete (360 degree) block. An indexing system further may include pre-drilled index holes or divots and a spring loaded bearing 226, which may be spring-loaded, to automatically and precisely, yet temporarily, lock the fences 210 and 212 in the positions needed for the desired angles depending on the number of wedges (divisions) desired.

To use some embodiments of the sliding sled system, a user installs the ACCU-SLICE™ rail system onto a band saw table as previously disclosed. A user then places the sliding sled device 100 onto the installed rail system 102 so that the sawdust shield 232 side of the device 100 faces the sawblade 162 and the roller bearings 168 are on either side of the ACCU-SLICE™ rail. The user sets each movable fence 210 and 212 to the desired number of wedges by releasing the locking bolts 218 from the locking channel 220, sliding each fence 210 and 212 until an indicator alignment slot 223 on the movable end 216 and 217 indicates the desired number of wedges and allowing the spring loaded bearing 226 to spring into the corresponding index hole 224 on the flat plate 228, taking care that each fence 210 and 212 is set to the same number of wedges. A user may removably fix a stop to the band saw table across the plane of the blade and just before the blade to ensure wedges of uniform width, and may removably fix a ramp behind the blade to help move wedges away from the blade after they are cut.

The user places a wood blank workpiece against one fence on the blade side of the fence, pushes it forward until it hits the stop, holds it against the fence with hands safely away from the blade and slides the sled, along with the workpiece, across the blade to form the first cut (the piece removed is not one of the wedges for assembly). The user then slides the sled back to the pre-blade position, places the workpiece on the blade side of the other fence and pushes it up against the stop so the side of the workpiece that was just cut hits the stop. The user holds the workpiece against the fence, slides the sled with the workpiece across the blade to form the second cut of the first wedge, allowing the cut wedge to fall away from the blade. The user repeats the process, alternating fences, until the desired number of wedges are cut, making sure the workpiece is not rotated and the previously cut edge is presented toward the stop when the workpiece is placed against a fence. Clamps may be used to hold a workpiece against a fence. Sawdust accumulates on the blade side of the device but is prevented from entering the roller bearing 168 and guide rail 112 area because it is blocked by the sawdust shield 232. Optimal functioning of the roller bearings 168 and guide rail 112 requires smooth sliding; keeping sawdust away from the roller bearing 168 and guide rail 112 area maintains and improves smooth slidability and optimizes performance.

In some embodiments the indexing system 200 includes a locking bolt 218, and a spring loaded bearing 226. The user may release the locking bolt to allow the fence to change angles. The spring loaded bearing may move up and down to enter and exit index holes or divots that align the fence to the proper angle. In some embodiments the user may hear or see an indication that the spring loaded bearing is in an index hole or divot, or they may feel the resistance to movement of the fence when the spring loaded bearing is in an index hole or divot. Once the adjustable guide fence is properly aligned by the spring loaded bearing, the user may secure the locking bolt to lock the position of the fence into the desired position.

FIGS. 6-10 show some embodiments of a rail system 102 that may include a guide rail 112, a base 114, an indexing support 116, and an indexing device 120 that may include an indexing screw 118, an adjustable extension 144, and a receiving structure 146. The rail system 102 may also include an anchor bar 136 with an anchor bar first end 140 and an anchor bar second end 142, anchor mechanisms 138, a first guide bar 124, a second guide bar 126, a first linear guide 128 and a second linear guide 130. In some embodiments the rail system 102 includes a first guide slot 132 and a second guide slot 134. The rail system 102 may include releasable fasteners 122 to hold and release the position of the base 114 or indexing support 116 relative to the first guide bar 124 and second guide bar 126.

The sliding sled 110 may include bearings 168 (FIGS. 3 and 5) that allow for a smooth interaction with the guide rail 112.

Referring to FIGS. 6-10, a rail system 102 may be mountable in a saw table 164 with a cutting plane 160 defined by a line along the saw table and defined by the cutting edge of the blade 162. The saw table 164 may have a table length along the cutting plane 160 and a miter slot 166 that is parallel to the cutting plane 160.

Figure 7:
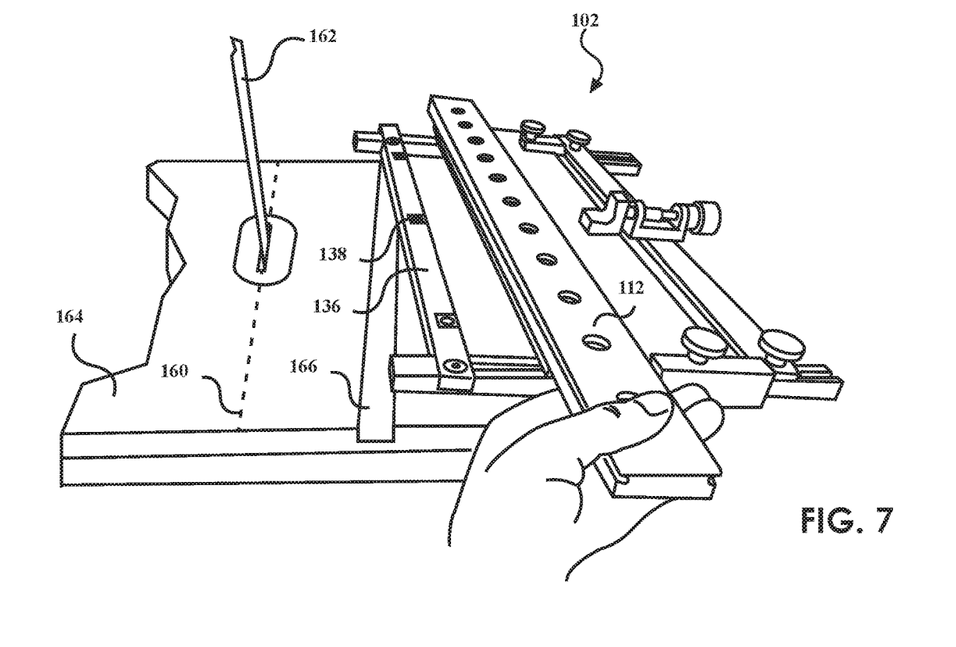
FIG. 7 shows an example band saw table with a miter slot, and an example rail system.
Figures 8, 9:
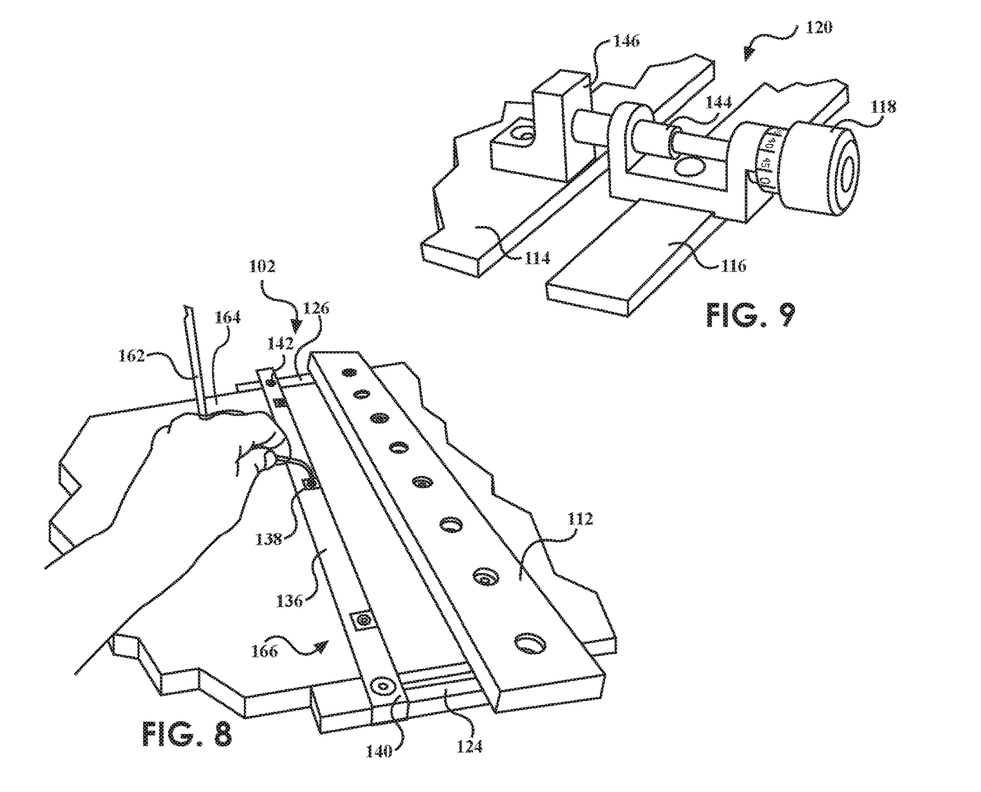
FIG. 8 shows an example rail system mounted in the miter slot of a band saw table.
FIG. 9 shows an example indexing device for making incremental movements transversely towards the cutting plane.

As seen in FIGS. 7 and 8, a user may move the rail system 102 so that the anchor bar 136 is in position in the miter slot 166 of a saw table 164. The anchor bar 136 may be mountable in the miter slot 166 with at least one anchor mechanism 138 to removably secure the anchor bar in the miter slot 166. The anchor mechanism 138 may be a brass locking nut that moves laterally when turned so that by turning a bolt or screw, the locking mechanism 138 pushes against the sides of the miter slot 166 thereby removably mounting the anchor bar 136 in the miter slot 166. Other anchor mechanisms may be used including magnetic, expanding, fasteners, or other anchor mechanisms capable of securing the anchor bar to the miter slot 166.

In some embodiments the anchor bar 136 has an anchor bar first end 140 and an anchor bar second end 142. The anchor bar 136 may have a top that sits relatively flush with the saw table 164 when installed. The anchor bar first end 140 and anchor bar second end 142 may extend beyond the length of the saw table 164 and both ends 140, 142 may be connected to guide bars. In some embodiments the first guide bar 124 may be perpendicularly connected to the anchor bar first end 140 and may extend away from the cutting plane 160. The second guide bar 126 may be perpendicularly connected to the anchor bar second end 142 and may extend away from the cutting plane 160.

The anchor bar 136 may have an adjustable connection with the second guide bar to adjust the distance between the first guide bar 124 and the second guide bar 126. In some embodiments the distance between the first guide bar 124 and the second guide bar 126 may be adjusted so that when the rail system 102 is installed on a saw table 164 the first guide bar 124 and the second guide bar 126 are parallel to and in close proximity to edges of the saw table 164. In other embodiments the first guide bar 124 and the second guide bar 126 may be configured so that they are not in close proximity to edges of the saw table 164. In some embodiments there may be a distance between the first guide bar 124 and the second guide bar 126 between about twelve inches to about thirty-six inches. Some embodiments may have an adjustment of the distance between the first and second guide bars 124, 126, for example, a rail system 102 may be adjustable between about fifteen inches and seventeen inches, and may fit on saw tables with a length between about fifteen inches to about seventeen inches.

In some embodiments a base 114 may be slidably engaged to the first guide bar 124 and the second guide bar 126 and may allow the base 114 to have transverse movement relative to the cutting plane 160. The base 114 may have a length that is greater than the distance between the first guide bar 124 and the second guide bar 126. The base may be a solid material, such as a plate which may be made of metal, and which may be capable of rigidly holding a shape and supporting the guide rail 112 and sliding sled 110.

In some embodiments a guide rail 112 may be connected to the base 114. The guide rail 112 may be perpendicular to the first guide bar 124 and the second guide bar 126, and may be positioned parallel to the anchor bar 136. The length of the guide rail 112 may determine the length of wood piece or workpiece that can be cut using the rail system 102. In some embodiments guide rails may be from twelve inches to sixty inches long. Larger lengths can also be made. Some embodiments may have guide rail 112 lengths of twenty-four inches, thirty-six inches, forty-eight inches and seventy-two inches, and ninety-six inches. The illustrations show a guide rail 112 as a single rail with bearings riding on side grooves on the rail. In some embodiments the guide rail 112 includes multiple rails, and may include a system where the sliding sled 110 rides in one or more channels, grooves, or structures to move the sliding sled 110 substantially rectilinearly and parallel to the cutting plane 160.

In some embodiments the first guide bar 124 may have a first guide slot 132. The second guide bar 126 may have a second guide slot 134. The base may include releasable fasteners 122 connected to the first guide slot 132 and the second guide slot 134. The releasable fasteners 122, when loose may allow the base 114 and the indexing support 116 to move along the first guide bar 124 and the second guide bar 126 with a movement towards or away from the cutting plane 160.

Figure 10:
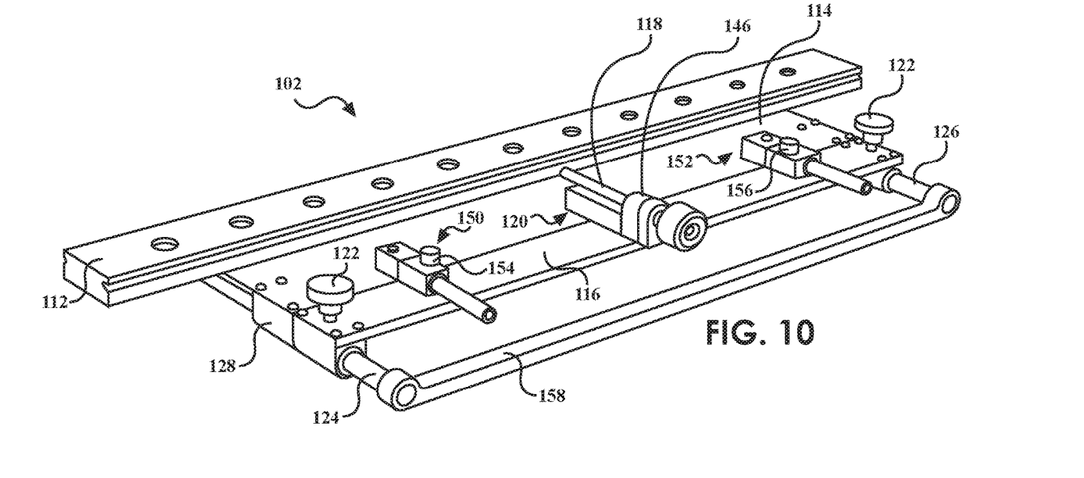
FIG. 10 shows an example rail system without a sliding sled including indexing guides.

The base 114 may include one or more linear guides 128 that extend along the first guide bar 124 and prevent substantial linear deviation of the base 114 as it moves along the first guide bar 124. The example embodiment shown in FIG. 6 includes guide bars 124, 126 with guide slots 132, 134 or channels to direct the travel of the base 114 and indexing support 116. In the embodiment of FIG. 10 the guide bars 124, 126 may be bars that pass through a tight fitting opening in the linear guides 128, 130 that are connected to the base 114 and the indexing support 116. In some embodiments the indexing support 116 may be positioned on the guide bars 124, 126 further from the anchor bar 136 than the base 114.

In some embodiments the indexing support 116 may be slidably engaged to the first guide bar 124 and the second guide bar 126 to allow the indexing support to have transverse movement relative to the cutting plane 160. The rail system 102 may provide incremental advancement of the workpiece towards the cutting plane 160 by tightening the releasable fasteners 122 connected to the indexing support 116, and adjusting a distance between the indexing support 116 and the base 114, thereby adjusting the distance between the base 114 and the cutting plane 160. The guide rail 112 and sliding sled 110 may move with the base 114, and therefore adjusting the distance between the indexing support 116 and the base 114 while the indexing support 116 is secured relative to the guide bars 124, 126 which may adjust the distance of the sliding sled 110 and a workpiece supported by the sliding sled 110.

An indexing device 120 may be connected to the indexing support 116 and may extend towards the base 114, wherein the indexing device 120 may adjust a distance between the indexing support 116 and the base 114.

In some embodiments the indexing device 120 may include an indexing screw 118 which may be secured to the indexing support 116. The indexing device 120 may include a receiving structure 146 connected to the base 114, wherein the receiving structure 146 may be aligned to receive an adjustable extension 144 supported by the indexing support 116. Adjusting the indexing screw 118 adjusts the distance between the indexing support 116 and base 114.

In the embodiment shown in FIG. 10 the adjustable extension may include an indexing screw 118 where the receiving structure 146 includes a threaded opening configured to receive the indexing screw 118. In some embodiments a first indexing guide 150 may be connected between the base 114 and the indexing support 116. The first indexing guide 150 may include a first indexing lock 154 to secure the distance between the indexing support 116 and the base 114. A second indexing guide 152 may also be connected between the base 114 and the indexing support 116 and may have a second indexing lock 156 to secure the distance between the indexing support 116 and the base 114.

In some embodiments ends of the first guide bar 124 and the second guide bar 126 may be connected to a frame support 158. The frame support 158 may secure the distance between the first guide bar 124 and the second guide bar 126 at a second end, while the anchor bar 136 may secure the distance at the first end.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents which may be resorted to, fall within the scope of the invention.

What is claimed is:

1. A band saw table with a combination sliding sled and rail system, for use with a band saw in a cutting plane, the band saw table having a miter slot that is parallel to the cutting plane, the combination sliding sled and rail system comprising:
   a rail system mountable on the band saw table with a guide rail parallel to the cutting plane, the rail system comprising:
      an anchor bar fixed in the miter slot with at least one anchor mechanism to removably secure the anchor bar in the miter slot and prevent movement of the anchor bar relative to the band saw table;
      wherein the guide rail is connected to the anchor bar and positioned parallel to the anchor bar;
   a sliding sled comprising:
      a flat plate mountable on the guide rail, the flat plate having a top side, and a front edge parallel to the guide rail,
      a first adjustable guide fence connected to the top side of the flat plate at a first fixed pivot end of the first adjustable guide fence, wherein the first adjustable guide fence is adjustable about the first fixed pivot end to create a first oblique angle relative to the front edge of the flat plate;
      a first locking fastener connected to the first adjustable guide fence to releasably fix the first oblique angle of the first adjustable guide fence;
      a second adjustable guide fence connected to the top side of the flat plate at a second fixed pivot end of the second adjustable guide fence, wherein the second adjustable guide fence is adjustable about the second fixed pivot end to create a second oblique angle relative to the front edge of the flat plate;
      a second locking fastener connected to the second adjustable guide fence to releasably fix the second oblique angle of the second adjustable guide fence; and
      an indexing system including angle indicators on the flat plate.

2. The band saw table of claim 1 wherein the indexing system further comprises:
   a first spring loaded bearing mounted in the first adjustable guide fence with the first spring loaded bearing biased against the top side of the flat plate; and
   multiple divots on the top side of the flat plate, the multiple divots positioned to allow the first spring loaded bearing to enter the multiple divots when the first adjustable guide fence is at oblique angles corresponding to the angle indicators.

3. The band saw table of claim 2 wherein the multiple divots are positioned to correspond to the angle indicators on the flat plate.

4. The band saw table of claim 1 wherein the first adjustable guide fence includes a first movable end, and wherein the first movable end aligns with each of the angle indicators when the angle of the first adjustable guide fence relative to the cutting plane corresponds to each of the angle indicators.

5. The band saw table of claim 1 wherein the flat plate includes a bottom side, the sliding sled further comprising:
   a sawdust shield extending from the bottom side of the flat plate.

6. The band saw table of claim 1 wherein the flat plate includes a bottom side, the sliding sled further comprising:
   multiple bearings connected to the bottom side of the sliding sled for connecting to the guide rail and allow the sliding sled to move along the guide rail parallel to the cutting plane.

7. The band saw table of claim 1 wherein the first locking fastener is a locking bolt, the sliding sled further comprising a locking channel in the flat plate, wherein the locking bolt extends into the locking channel.

8. A band saw table for use with a band saw blade in a cutting plane, the band saw table having a miter slot, the band saw table comprising:
   a rail system comprising:
      an anchor bar fixed in the miter slot with at least one anchor mechanism to removably secure the anchor bar in the miter slot and prevent movement of the anchor bar relative to the band saw table;
      a guide rail connected to the anchor bar and positioned parallel to the anchor bar;
   a sliding sled comprising:
      a flat plate mounted on the guide rail, the flat plate having a top side, a bottom side, and a front edge parallel to the guide rail;
      a first adjustable guide fence connected to the top side of the flat plate at a first fixed pivot end of the first adjustable guide fence, wherein the first adjustable guide fence is adjustable about the first fixed pivot end to create a first oblique angle relative to the front edge of the flat plate;
      a first locking fastener connected to the first adjustable guide fence to releasably fix the first oblique angle of the first adjustable guide fence;
      a second adjustable guide fence connected to the top side of the flat plate at a second fixed pivot end of the second adjustable guide fence, wherein the second adjustable guide fence is adjustable about the second fixed pivot end to create a second oblique angle relative to the front edge of the flat plate;
      a second locking fastener connected to the second adjustable guide fence to releasably fix the second oblique angle of the second adjustable guide fence; and
      multiple bearings connected to the bottom side of the sliding sled for connecting to the guide rail and allow the sliding sled to move on top of and along the guide rail parallel to the cutting plane.

9. The band saw table of claim 8 further comprising:
   an indexing system including angle indicators on the flat plate.

10. The band saw table of claim 9 wherein the first adjustable guide fence includes a first movable end, the first movable end aligns with each of the angle indicators when the angle of the first adjustable guide fence relative to the cutting plane corresponds to each of the angle indicators.

11. The band saw table of claim 9 wherein the indexing system further comprises:
   a first spring loaded bearing mounted in the first adjustable guide fence with the first spring loaded bearing biased against the top side of the flat plate;
   a second spring loaded bearing mounted in the second adjustable guide fence with the second spring loaded bearing biased against the top side of the flat plate; and
   multiple divots on the top side of the flat plate, the multiple divots positioned to allow the first spring loaded bearing and the second spring loaded bearing to enter the multiple divots when the first adjustable guide fence and the second adjustable guide fence are at oblique angles corresponding to the angle indicators.

12. A band saw table with a device mountable in the band saw table with a cutting plane, the band saw table having a table length along the cutting plane and a miter slot that is parallel to the cutting plane, the device comprising:
   an anchor bar fixed in the miter slot with at least one anchor mechanism to removably secure the anchor bar in the miter slot and prevent movement of the anchor bar relative to the band saw table,
   a guide rail connected to the anchor bar, wherein the guide rail is parallel to the anchor bar; and
   a sliding sled slidably engaged on the guide rail for movement along the guide rail in a direction parallel to the cutting plane, the sliding sled comprising:
      a first adjustable guide fence with a first fixed pivot end connected to the sliding sled, the first adjustable guide fence is adjustable between various oblique angles relative to the cutting plane; and
      a second adjustable guide fence with a second fixed pivot end connected to the sliding sled, the second adjustable guide fence is adjustable between various oblique angles relative to the cutting plane.

13. The band saw table according to claim 12 wherein the anchor bar includes an anchor bar first end and an anchor bar second end;
   a first guide bar perpendicularly connected to the anchor bar first end and extending away from the cutting plane;
   a second guide bar perpendicularly connected to the anchor bar second end and extending away from the cutting plane; and
   a base slidably engaged to the first guide bar and the second guide bar to allow the base to have transverse movement relative to the cutting plane.

14. The band saw table according to claim 12 wherein the sliding sled includes a bottom side, the sliding sled further comprising:
   a sawdust shield extending from the bottom side of the sliding sled.

15. The band saw table according to claim 12 further comprising an indexing system including angle indicators on the sliding sled.

16. The band saw table of claim 15, wherein the first adjustable guide fence includes a first movable end, the first movable end aligns with each of the angle indicators when the angle of the first adjustable guide fence relative to the cutting plane corresponds to each of the angle indicators.

17. The band saw table according to claim 15, wherein the sliding sled includes a top side, the indexing system further comprising:
   a first spring loaded bearing mounted in the first adjustable guide fence with the first spring loaded bearing biased against the top side of the sliding sled;
   a second spring loaded bearing mounted in the second adjustable guide fence with the second spring loaded bearing biased against the top side of the sliding sled; and
   multiple divots on the top side of the sliding sled, the multiple divots positioned to allow the first spring loaded bearing and the second spring loaded bearing to enter the multiple divots when the first adjustable guide fence and the second adjustable guide fence are at oblique angles corresponding to the angle indicators.

* * * * *

UNITED STATES PATENT AND TRADEMARK OFFICE
CERTIFICATE OF CORRECTION

PATENT NO. : 10,562,205 B2
APPLICATION NO. : 15/788541
DATED : February 18, 2020
INVENTOR(S) : Manura et al.

Page 1 of 1

It is certified that error appears in the above-identified patent and that said Letters Patent is hereby corrected as shown below:

On the Title Page

Item (72) Inventor is corrected to read:
-- John J. Manura, Ringoes, (NJ);
Thomas F. Coughlan, Sellersville, (PA);
Daniel Joseph Niedziocha, New Hope, (PA);
Christopher Wayne Baker, Doylestown, (PA);
Daniel Lieske, Warrington, (PA) --

Item (73) should read:
Assignee: ACCU-SLICE, LLC (Ringoes, NJ)

Signed and Sealed this
Thirtieth Day of June, 2020

Andrei Iancu
*Director of the United States Patent and Trademark Office*